United States Patent
Kimura et al.

(10) Patent No.: US 12,386,243 B2
(45) Date of Patent: Aug. 12, 2025

(54) LENS DRIVE MODULE, IMAGING MODULE, ELECTRONIC DEVICE, AND LENS UNIT

(71) Applicants: SONY SEMICONDUCTOR SOLUTIONS CORPORATION, Kanagawa (JP); SONY GROUP CORPORATION, Tokyo (JP)

(72) Inventors: Katsuji Kimura, Kanagawa (JP); Takayuki Kunimitsu, Kumamoto (JP); Kohei Imayoshi, Kumamoto (JP); Takahiro Tsuruta, Kumamoto (JP); Isao Yamamoto, Kumamoto (JP); Hideaki Okano, Tokyo (JP); Daisuke Hirono, Kanagawa (JP)

(73) Assignees: SONY GROUP CORPORATION, Tokyo (JP); SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 91 days.

(21) Appl. No.: 18/043,420

(22) PCT Filed: Aug. 18, 2021

(86) PCT No.: PCT/JP2021/030166
§ 371 (c)(1),
(2) Date: Feb. 28, 2023

(87) PCT Pub. No.: WO2022/054513
PCT Pub. Date: Mar. 17, 2022

(65) Prior Publication Data
US 2023/0324768 A1  Oct. 12, 2023

(30) Foreign Application Priority Data
Sep. 10, 2020 (JP) .................. 2020-152077

(51) Int. Cl.
G03B 13/34 (2021.01)
G02B 7/04 (2021.01)
H01F 7/08 (2006.01)

(52) U.S. Cl.
CPC ............. *G03B 13/34* (2013.01); *H01F 7/081* (2013.01)

(58) Field of Classification Search
CPC ........ G03B 13/34; G03B 11/00; G03B 30/00; G02B 7/04; H01F 7/081; H01F 7/0289
See application file for complete search history.

(56) References Cited

U.S. PATENT DOCUMENTS

2020/0387049 A1* 12/2020 Kimura ................. G03B 13/36
2021/0294070 A1*  9/2021 Tanaka ................. G03B 13/36

FOREIGN PATENT DOCUMENTS

| JP | 09-171630 A | 6/1997 |
| JP | 2005-037865 A | 2/2005 |

(Continued)

OTHER PUBLICATIONS

International Search Report and Written Opinion of PCT Application No. PCT/JP2021/030166, issued on Nov. 9, 2021, 09 pages of ISRWO.

*Primary Examiner* — Marly S Camargo
(74) *Attorney, Agent, or Firm* — CHIP LAW GROUP

(57) ABSTRACT

Provided are a lens drive module, an imaging module, an electronic device, and a lens unit that have a simple configuration and are advantageous in reducing power consumption. The lens drive module includes a lens unit that includes a plurality of lenses and a spacer that includes a ferromagnetic material provided between two adjacent lenses among the plurality of lenses, and a lens actuator that causes an electromagnetic force to act on the lens unit in response to energization.

10 Claims, 7 Drawing Sheets

(56) References Cited

FOREIGN PATENT DOCUMENTS

| JP | 2010-085494 A | | 4/2010 | |
|----|---------------|---|--------|---|
| JP | 2011-133661 | * | 7/2011 | ............... G02B 3/00 |
| JP | 2011-133661 A | | 7/2011 | |
| JP | 2016-106239 A | | 6/2016 | |
| JP | 2018-189703 A | | 11/2018 | |

* cited by examiner

LENS DRIVE MODULE, IMAGING MODULE, ELECTRONIC DEVICE, AND LENS UNIT

CROSS REFERENCE TO RELATED APPLICATIONS

This application is a U.S. National Phase of International Patent Application No. PCT/JP2021/030166 filed on Aug. 18, 2021, which claims priority benefit of Japanese Patent Application No. JP 2020-152077 filed in the Japan Patent Office on Sep. 10, 2020. Each of the above-referenced applications is hereby incorporated herein by reference in its entirety.

TECHNICAL FIELD

The present disclosure relates to a lens drive module, an imaging module, an electronic device, and a lens unit.

BACKGROUND ART

Recently, imaging devices have been developed to have a large number of pixels, a large aperture, a high performance, and a small size. With such imaging devices having a large number of pixels and a high performance, the power consumption of their solid-state imaging devices such as charge-coupled device (CCD) image sensors and complementary metal-oxide-semiconductor (CMOS) image sensors also tends to increase. In addition, such imaging devices having a large aperture include a large and heavy lens, so that the power consumption of an actuator that moves the lens for focus adjustment and the like tends to increase.

Against the background of such an increase in power consumption, it is necessary to reduce the power consumption of the entire device. For example, in order to reduce the power consumption of an actuator that moves a lens, a device has been proposed that drives the lens to move while controlling the magnetic field.

In an imaging module illustrated in FIG. 15 of PTL 1, a magnetic layer is provided on the outer circumference of a lens laminate. An electromagnetic driving force according to a magnetic field generated by an electromagnetic coil and the positional relationship between the magnetic layer and a fixed-side lens drive mechanism acts on the magnetic layer, and the lens laminate moves in the optical axis direction.

In a lens drive device disclosed in PTL 2, an L-shaped yoke being disposed on the outside of a magnet prevents the magnetic force from leaking to the outside of the lens housing, so that the magnetic flux of the magnet is drawn into the yoke to suppress the reduction in the thrust force of the actuator.

In a lens drive device disclosed in PTL 3, one of a moving body and a fixed body is provided with a first drive coil and a second drive coil, and the other is provided with a drive magnet. The moving body including a lens is moved in the optical axis direction by magnetic attraction and magnetic repulsion between the drive magnet and the first and second drive coils.

CITATION LIST

Patent Literature

[PTL 1]
  JP 2016-106239 A
[PTL 2]
  JP 2010-85494 A
[PTL 3]
  JP 2005-37865 A

SUMMARY

Technical Problem

In the imaging module of PTL 1, the magnetic layer, which is unnecessary in normal imaging modules, needs to be provided on the outer circumference of the lens laminate, which complicates the configuration of the device and increases the labor required for manufacturing. Further, in the imaging module of PTL 1, a ferromagnetic resin is used to bond the lenses together, and the application of such a resin requires precise control. This makes it difficult to increase productivity and also to manufacture the imaging module at low cost. Further, in imaging modules mounted on latest mobile terminals, lens holders are often used to align and fix lenses to each other. In the case of using the lens holders, it is not necessary to bond the lenses together using a resin. Further, the imaging module of PTL 1 does not have a spacer, so that stray light such as flare light cannot be removed. As a result, the imaging module is inferior in optical performance.

The yoke, which has a unique shape, used in the lens drive device of PTL 2 is expensive, and such a yoke as installed results in a complicated structure. Further, in the case where a moving magnet type of camera shake correction mechanism, which has been widely used in recent years, is applied to the lens drive device of PTL 2, the power consumption required for camera shake correction is large due to the weight of the yoke. Therefore, there is a concern that heat generated by the lens drive device is likely to be remarkable, and the driving time of the lens drive device is reduced when powered by a battery.

In the lens drive device of PTL 3, in order to move the moving body including the lens, it is necessary to move the heavy drive magnet. Therefore, in the case where the moving magnet type of camera shake correction mechanism is applied to the lens drive device of PTL 3, there is a concern of an increased power consumption, heat generated in the lens drive device, and a reduced driving time of the lens drive device when powered by a battery.

Accordingly, the present disclosure provides a lens drive module, an imaging module, an electronic device, and a lens unit that have a simple configuration and are advantageous in reducing power consumption.

Solution to Problem

One aspect of the present disclosure relates to a lens drive module including: a lens unit that includes a plurality of lenses and a spacer that includes a ferromagnetic material provided between two adjacent lenses among the plurality of lenses; and a lens actuator that causes an electromagnetic force to act on the lens unit in response to energization.

The lens unit may include a plurality of spacers each of which is provided between two adjacent lenses, and all the spacers included in the lens unit may include a ferromagnetic material.

The lens unit may include a plurality of spacers each of which is provided between two adjacent lenses, and the plurality of spacers may include a spacer that includes a ferromagnetic material and a spacer that includes a non-ferromagnetic material.

The lens actuator may include a coil that is provided integrally with the lens unit so as to be energized, and a magnet that applies a magnetic field to the coil.

The coil may be located between the spacer that includes the ferromagnetic material and the magnet.

The spacer that includes the ferromagnetic material, the coil, and the magnet may be located in a same straight line extending in a direction perpendicular to an optical axis of the plurality of lenses.

Another aspect of the present disclosure relates to an imaging module including: a lens unit that includes a plurality of lenses and a spacer that includes a ferromagnetic material provided between two adjacent lenses among the plurality of lenses; an imaging element that performs photoelectric conversion of light entering through the plurality of lenses; and a lens actuator that causes an electromagnetic force to act on the lens unit in response to energization to adjust a distance between the lens unit and the imaging element.

The imaging element may have a flip-chip structure.

The imaging element may have a CSP structure.

A lens may be provided that is located between the lens unit and the imaging element and is separate from the plurality of lenses included in the lens unit.

An infrared cut filter may be provided.

Another aspect of the present disclosure relates to an electronic device including: a lens unit that includes a plurality of lenses and a spacer that includes a ferromagnetic material provided between two adjacent lenses among the plurality of lenses; an imaging element that performs photoelectric conversion of light entering through the plurality of lenses; a lens actuator that causes an electromagnetic force to act on the lens unit in response to energization to adjust a distance between the lens unit and the imaging element; and a circuit board that receives an electrical signal from the imaging element.

Another aspect of the present disclosure relates to a lens unit including: a plurality of lenses; and a spacer that includes a ferromagnetic material provided between two adjacent lenses among the plurality of lenses.

DESCRIPTION OF EMBODIMENTS

[Lens Drive Module]

Figure 1:
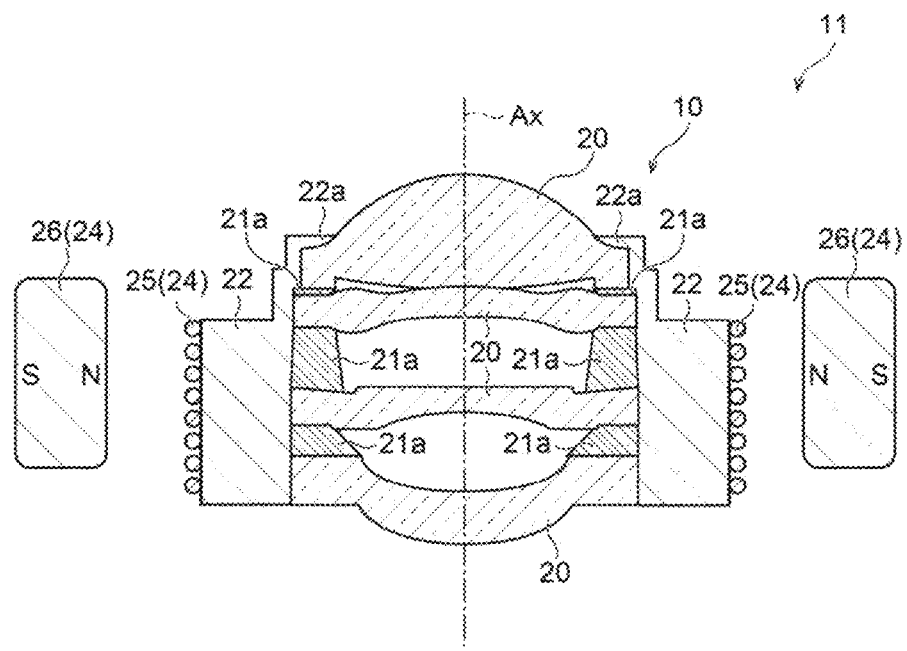
FIG. 1 is a cross-sectional view illustrating a schematic configuration of an example of a lens drive module.

FIG. 1 is a cross-sectional view illustrating a schematic configuration of an example of a lens drive module 11.

The lens drive module 11 includes a lens unit 10 including a plurality of lenses 20; and a lens actuator 24 that causes an electromagnetic force to act on the lens unit 10 in response to energization.

The plurality of lenses 20 included in the lens unit 10 are arranged in a direction in which an optical axis Ax extends (hereinafter referred to as "optical axis direction"). The lens unit 10 illustrated in FIG. 1 includes four lenses 20. However, the number of lenses 20 is not limited to a specific number.

Each lens 20 has a lens central portion positioned on the optical axis Ax through which a light beam is transmitted and a lens peripheral portion extending outward from the lens central portion. Light from a subject passes through the central portion of each lens 20. A light-shielding film (not illustrated) that blocks stray light may be provided on the lens peripheral portion of each lens 20 (for example, a lens side surface and/or a surface in contact with a ferromagnetic spacer 21a, which will be described later).

The spacer 21a including a ferromagnetic material (hereinafter referred to as a "ferromagnetic spacer") is provided between two lenses 20 adjacent to each other in the optical axis direction (especially, between lens peripheral portions). In the example illustrated in FIG. 1, all of the plurality of spacers included in the lens unit 10 are ferromagnetic spacers 21a.

Each ferromagnetic spacer 21a serves as a yoke into which a magnetic flux is drawn, as described below. Accordingly, each ferromagnetic spacer 21a may exhibit ferromagnetism as a whole, such as being entirely formed from a ferromagnetic material or partially including a ferromagnetic material. The composition and form of the ferromagnetic material included in each ferromagnetic spacer 21a are not limited. Examples of the ferromagnetic material included in each ferromagnetic spacer 21a may include a soft magnetic material, a hard magnetic material, and other magnetic materials. Typically, a substance such as ferrite, iron, cobalt or nickel, which exhibits ferromagnetism at room temperature (for example, 1 to 30° C.) may be included as a part or a whole in each ferromagnetic spacer 21a.

Each ferromagnetic spacer 21a acts as a joint that defines a spacing between adjacent lenses. Each ferromagnetic spacer 21a illustrated in FIG. 1 has a black color and has a light shielding property of blocking and rejecting stray light such as flare light caused by diffuse reflection in the lens.

The plurality of lenses 20 and the plurality of ferromagnetic spacers 21a included in the lens unit 10 are integrally supported by a holder 22. The holder 22 can be made from a plastic material such as polycarbonate, has a black color, and has a light shielding property.

The holder 22 illustrated in FIG. 1 has a tubular shape with a through hole. The plurality of lenses 20 and the plurality of ferromagnetic spacers 21a are arranged to be formed in layers in the through hole of the holder 22 and are fixedly supported. The manner in which the plurality of lenses 20 and the plurality of ferromagnetic spacers 21a are supported by the holder 22 is not limited. In the example illustrated in FIG. 1, one lens support portion 22a and the other lens support portion (not illustrated) of the holder 22 sandwich and support the plurality of lenses 20 and the plurality of ferromagnetic spacers 21a in the optical axis direction. In this way, the holder 22 cooperates with the spacers (the ferromagnetic spacers 21a in this example) to align and fixably support the plurality of lenses 20 and the plurality of ferromagnetic spacers 21a.

The lens actuator 24 is a voice coil motor driven actuator, and includes a first coil 25 provided integrally with the lens drive module 11 and magnets (that is, permanent magnets) 26 that applies a magnetic field to the first coil 25.

In the example illustrated in FIG. 1, the first coil 25 is fixedly wound around the outer circumference of the holder 22, and the first coil 25 moves along with the lens unit 10 in the optical axis direction. At a position farther from the optical axis Ax than the first coil 25, the plurality of magnets 26 are provided at equal angular intervals around the optical axis Ax. Each magnet 26 faces the first coil 25 at a distance from the first coil 25 to provide a magnetic field to the first coil 25. Note that, in FIG. 1, "N" indicates the north pole side of the corresponding magnet 26, and "S" indicates the south pole side of the corresponding magnet 26.

Regardless of the position of the lens unit 10 in the optical axis direction, at least a portion of the first coil 25 is located between the ferromagnetic spacers 21*a* and the magnets 26. In other words, regardless of the position of the lens unit 10 in the optical axis direction, at least one or more ferromagnetic spacers 21*a*, the first coil 25, and the magnets 26 are located in a same straight line extending in a direction perpendicular to the optical axis Ax.

In the lens drive module 11 having the configuration described above, the lens actuator 24 moves the lens unit 10 in the optical axis direction to adjust the focal position of the lens unit 10 (that is, the plurality of lenses 20). By controlling the direction and magnitude of the current flowing through the first coil 25 under Fleming's left-hand rule, the magnitude and direction of the electromagnetic force to act on the first coil 25 can be adjusted, and the magnitude and direction of the thrust force to act on the lens unit 10 can in turn be adjusted. In this way, the electromagnetic force (Lorentz force) to act on the first coil 25 in response to the energization of the first coil 25 can be used to dispose the lens unit 10 at a desired position on the optical axis Ax, thereby adjusting the focal position.

Note that the lens unit 10 is supported movably in the optical axis direction by a support unit (not illustrated). That support unit positions and supports the lens unit 10 at a reference position when the electromagnetic force in the optical axis direction does not act on the first coil 25. On the other hand, when the electromagnetic force in the optical axis direction acts on the first coil 25, the support unit supports the lens unit 10 while allowing the lens unit 10 to move in the optical axis direction. The lens unit 10 is disposed at a position where the electromagnetic force in the optical axis direction acting on the first coil 25 and the support force of the support unit are balanced. Such a support unit can be provided with any configuration. Typically, the support unit includes an elastic element such as a spring, and the elastic force of the elastic element can be used to support the lens unit 10.

In the lens drive module 11 according to the present embodiment, by the ferromagnetic spacers 21*a*, the magnetic field of the magnets 26 can effectively act on to the first coil 25. The ferromagnetic spacers 21*a* actively draws in the magnetic field of the magnets 26 to increase the strength (flux density) of the magnetic field from the magnets 26 towards the ferromagnetic spacers 21*a*. Therefore, the strength of the magnetic field acting on the first coil 25 located between the ferromagnetic spacers 21*a* and the magnets 26 also increases. As a result, even if the amount of current flowing through the first coil 25 is small, a large electromagnetic force acts on the first coil 25.

Note that there is a tendency that the larger each ferromagnetic spacer 21*a* (that is, the larger the area occupied by the ferromagnetic spacers 21*a*), the higher the strength of the magnetic field from the magnets 26 toward the ferromagnetic spacers 21*a*. On the other hand, a telescopic lens unit generally tends to have large spacing between the lenses, and the spacers disposed between the lenses also tend to be large accordingly. Therefore, in the case where the lens unit 10 according to the present embodiment is telescopic, particularly large ferromagnetic spacers 21*a* can be used to effectively increase the strength of the magnetic field acting on the first coil 25.

As described above, the lens unit 10 and the lens drive module 11 according to the present embodiment makes it possible to reduce the amount of power required to move the first coil 25 and the lens unit 10. Such low power driving of the lens unit 10 makes is possible to suppress heat generated by the lens drive module 11 and thus to prolong the driving time of the lens drive module 11 when powered by a battery.

Further, the lens unit 10 according to the present embodiment can be configured only with the non-ferromagnetic spacers of the existing lens unit replaced by the ferromagnetic spacers 21*a*, thereby avoiding a complicated structure (in particular, a complicated structure outside the lenses 20). Therefore, the lens unit 10 and the lens drive module 11 according to the present embodiment can reduce the power consumption compared to the conventional one while maintaining the same simple configuration as the conventional one.

In addition, by reducing the power consumption required to move the lens unit 10, restrictions on the size and weight of the lenses 20 to be used can be relaxed. The amount of current to be used to move the lens unit 10 is limited according to the battery capacity and the like, and thus it is necessary to appropriately select the size and weight of the lenses 20 within the allowable range of such a limited amount of current. According to the present embodiment, since the lens unit 10 can be driven with low power as described above, it is possible to use the high-performance lenses 20 that are larger and heavier than the conventional lenses.

Figure 2:
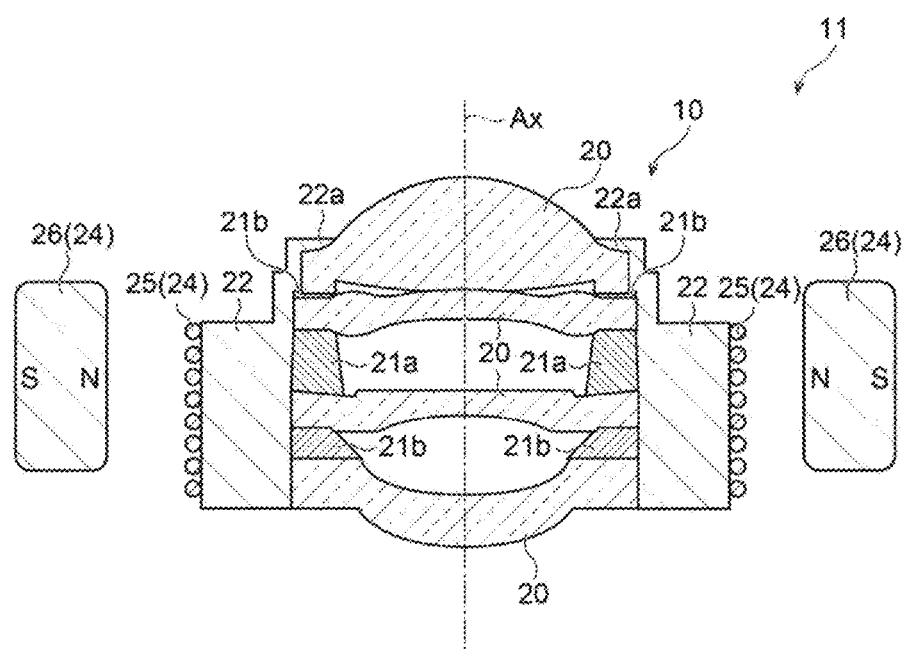
FIG. 2 is a cross-sectional view illustrating a schematic configuration of another example of a lens drive module.

FIG. 2 is a cross-sectional view illustrating a schematic configuration of another example of a lens drive module 11.

A lens unit 10 illustrated in FIG. 2 includes a plurality of spacers as in the lens unit 10 illustrated in FIG. 1, and in particular, the plurality of spacers include not only a ferromagnetic spacer 21*a* but also a spacer 21*b* including a non-ferromagnetic material (referred to as "non-ferromagnetic spacer").

The non-ferromagnetic spacers 21*b* is hardly magnetized as a whole, and can be formed from a paramagnetic material that is hardly magnetized in the direction of a magnetic field even when the magnetic field acts on them. The material(s) included in the non-ferromagnetic spacer 21*b* are not limited. For example, the non-ferromagnetic spacer 21*b* can be formed from a non-magnetic material such as aluminum or a plastic material including, for example, a synthetic resin.

In the lens unit 10 illustrated in FIG. 2, two spacers located on both end sides in the optical axis direction are each the non-ferromagnetic spacer 21*b*, and one spacer located in the center is the ferromagnetic spacer 21*a*. However, the positions and number of ferromagnetic spacers 21*a* and non-ferromagnetic spacers 21*b* are not limited. For example, from the viewpoint of causing a large magnetic field to act on a first coil 25, the largest spacer may correspond to the ferromagnetic spacer 21*a*. In addition, regardless of the position of the lens unit 10 in the optical axis direction, the spacer that is always located together with the magnets 26 and the first coil 25 in a same straight line extending in a direction perpendicular to the optical axis Ax may correspond to the ferromagnetic spacer 21a.

According to the lens unit 10 and the lens drive module 11 illustrated in FIG. 2, the lens unit 10 can be driven with low power while the increase in cost associated with the use of the ferromagnetic spacer 21a is suppressed.

The inventor(s) has performed a simulation based on the lens drive module 11 illustrated in FIG. 2 and examined a relationship between the position of the lens unit 10 and the thrust force ratio.

Figure 3:
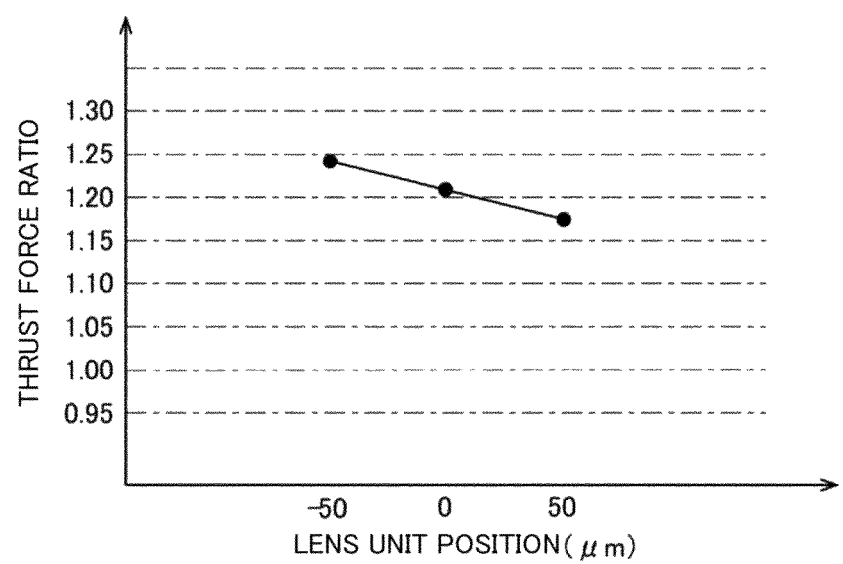
FIG. 3 is a graph of an example of a result of examining a relationship between the position of a lens unit and the thrust force ratio in the lens drive module illustrated in FIG. 2.

FIG. 3 is a graph of an example of a result of examining the relationship between the position of the lens unit 10 and the thrust force ratio in the lens drive module 11 illustrated in FIG. 2.

The "lens unit position" illustrated in FIG. 3 indicates the position of the lens unit 10 and the first coil 25 in the optical axis direction, and the reference position is represented by "0 μm". The "thrust force ratio" illustrated in FIG. 3 indicates the ratio of the magnitude of an electromagnetic force acting on the first coil 25 to the magnitude of an electromagnetic force acting on a first coil of a lens unit including spacers that are all non-ferromagnetic spacers (referred to as "reference lens unit"). In other words, the "thrust force ratio" in FIG. 3 can be represented by "thrust force ratio=(electromagnetic force acting on the first coil 25 of the lens drive module 11 in FIG. 2)/(electromagnetic force acting on the first coil of the reference lens unit)". In examination illustrated in FIG. 3, the lens unit 10 illustrated in FIG. 2 and the reference lens unit had the same properties except for the spacers. For example, in deriving the "electromagnetic force acting on the first coil" to obtain the thrust force ratio, the magnitude of the current flowing through the first coil of the lens unit 10 in FIG. 2 was set to be the same as that of the reference lens unit.

In FIG. 3, as the ferromagnetic spacer 21a of the lens drive module 11 of FIG. 2, a spacer was used that is formed from a general ferrite material having ferromagnetic properties (electric conductivity=1 S/m, relative permeability=640, and relative permittivity=1).

In FIG. 3, the "thrust force ratio" of the lens drive module 11 in FIG. 2 indicates a value greater than "1.00" regardless of the position of the lens unit 10 in the optical axis direction. Therefore, it can be seen that the lens unit 10 including the ferromagnetic spacer 21a can obtain a larger electromagnetic force than that of the reference lens unit not including the ferromagnetic spacer 21a. Even if the relative position of the lens unit 10 and the first coil 25 with respect to the magnets 26 deviates from the reference position by 50 μm in the optical axis direction due to manufacturing errors or the like, the lens drive module 11 illustrated in FIG. 2 can obtain a thrust force 15% or more larger than that of the reference lens unit. Further, by optimizing the relative position of the lens unit 10 and the first coil 25 with respect to the magnets 26, the lens drive module 11 illustrated in FIG. 2 can obtain a thrust force 20% or more larger than that of the reference lens unit (refer to "lens unit position=0 μm" in FIG. 3).

The result of examination of FIG. 3 demonstrates that such a lens unit 10 including the ferromagnetic spacer 21a can obtain a large electromagnetic force (that is, a thrust force) with a smaller amount of power consumption. In other words, the result of examination of FIG. 3 demonstrates that the lens unit 10 including the ferromagnetic spacer 21a can effectively reduce the power consumption required to obtain the desired thrust force.

In FIG. 3, the ferromagnetic spacer 21a is a spacer formed from a general ferrite material. However, the above-described functions and effects do not limit the ferromagnetic spacer 21a to a specific material. The ferromagnetic spacer 21, which is formed from any material exhibiting ferromagnetic properties, effectively draws in the magnetic field of the magnets 26 to increase the strength of the magnetic field to act on the first coil 25, and thus can effectively reduce the power consumption required to obtain the desired thrust force.

[Imaging Module and Electronic Device]

The lens drive module 11 including the ferromagnetic spacer 21a exemplified in FIGS. 1 and 2 can be applied to an imaging module including a solid-state imaging element, and the above-described lens actuator 24 can be used as an autofocus (AF) adjustment mechanism, for example. Such an imaging module can be applied to various electronic devices. For example, the above-described lens drive module 11 can be advantageously used in an imaging module installed in an imaging device (for example, a digital camera) or a portable terminal (for example, a mobile phone, a smart phone, a tablet, a computer, etc.). Note that an electronic device such as an imaging device may itself be an independent device, or may be configured as a part of an independent device.

Typical implementations of imaging modules and electronic devices to which the lens drive module 11 including the ferromagnetic spacer 21a can be applied are exemplified below. Only a partial configuration of an imaging module and an electronic device will be described below, and the actual imaging module and electronic device may include components and configurations not described below as appropriate. Further, imaging modules and electronic devices to which the lens drive module 11 including the ferromagnetic spacer 21a can be applied are not limited to the following examples.

[First Example of Imaging Module and Electronic Device]

Figure 4:
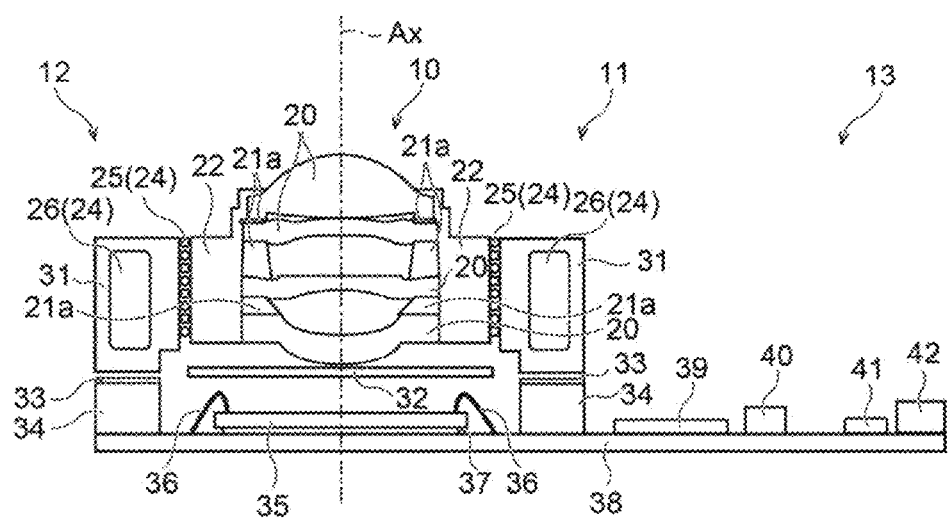
FIG. 4 is a diagram illustrating a schematic configuration of an example of an electronic device (imaging device).

FIG. 4 is a diagram illustrating a schematic configuration of an example of an electronic device 13. In FIG. 4, components that are the same as or similar to those illustrated in FIGS. 1 and 2 are designated by the same reference numerals, and detailed description thereof will be omitted.

An imaging module 12 included in the electronic device 13 illustrated in FIG. 4 includes the lens drive module 11 illustrated in FIG. 1 and an imaging element 35 (for example, a CCD image sensor or a CMOS image sensor). Specifically, the imaging module 12 includes the lens unit 10 including the ferromagnetic spacers 21a, the imaging element 35 that performs photoelectric conversion of light entering through the plurality of lenses 20, and the lens actuator 24 that adjusts a distance between the lens unit 10 and the imaging element 35.

The imaging element 35 is fixed to the circuit board 38 via a support member 37 and positioned on the optical axis Ax so as to face the plurality of lenses 20 in the optical axis direction. Subject light is condensed at the light-receiving surface of the imaging element 35 by the plurality of lenses 20, and the imaging element 35 acquires image data (that is, imaging data) of the subject under the control of a controller (not illustrated).

The imaging element 35 is electrically connected to the circuitry (not illustrated) of the circuit board 38 via wiring 36 formed of metal wires. The circuitry of the circuit board 38 can receive electric signals (for example, imaging data) from the imaging element 35 and output them to the external devices. The circuit board 38 illustrated in FIG. 4 has a plate shape. However, the shape and configuration of the circuit board 38 are not limited, and the circuit board 38 may have a non-plate shape.

An infrared cut filter 32 for removing infrared light is provided between the plurality of lenses 20 and the imaging element 35. The light transmitted through the plurality of lenses 20 (in particular, the lens central portion) and entering the infrared cut filter 32 goes out from the infrared cut filter 32 with the infrared light component having been removed by the infrared cut filter 32, and then heads toward the imaging element 35.

A plurality of connection support portions 34, a lens controller 39, a sensor 40, a storage device 41, and a connector 42 are fixedly attached to the circuit board 38.

A second coil 33 is fixed to an upper portion of each connection support portion 34. Each connection support portion 34 electrically connects the circuitry of the circuit board 38 and the corresponding second coil 33. Each second coil 33 is supplied with current from the lens controller 39 through the circuitry of the circuit board 38 and the corresponding connection support portion 34.

Each second coil 33 is positioned so as to face the corresponding magnet 26 held by an actuator holder 31 in the optical axis direction so that an electromagnetic force acts in a direction perpendicular to the optical axis Ax in response to energization. In this way, by the electromagnetic force acting on each second coil 33, the relative position between the lens unit 10 (particularly the plurality of lenses 20) and the imaging element 35 (particularly the light receiving surface) is adjusted, so that the effects of camera shake are reduced. Thus, the second coils 33 and the magnets 26 work as an actuator for an optical image stabilizer (OIS) type of camera shake correction. Each magnet 26 provided in the actuator holder 31 also works as a lens actuator 24 for autofocus by cooperating with the first coil 25 as described above.

The lens controller 39 includes an integrated circuit (IC), and functions as a camera shake correction driver as well as an autofocus driver. The lens controller 39 is electrically connected to the second coil 33 via the circuitry of the circuit board 38 and the connection support portion 34 as described above, and is electrically connected to the first coil 25 via the circuitry of the circuit board 38 and wiring (not illustrated). Further, the lens controller 39 is electrically connected to the sensor 40, the storage device 41, the connector 42, and other devices through the circuitry of the circuit board 38.

For example, when a gyro sensor included in the sensor 40 detects camera shake, the lens controller 39 supplies to the second coil 33 a current corresponding to the camera shake detection signal from the gyro sensor to correct the camera shake. Further, the lens controller 39 supplies to the first coil 25 a current corresponding to an autofocus signal from a device (not illustrated) to move the lens unit 10 in the optical axis direction and thus perform focus adjustment.

The storage device 41 stores and holds various types of data (including programs). For example, correction values for compensating for variations (individual differences) of the imaging module 12 are stored in the storage device 41. Reading of data stored in the storage device 41 and writing (including updating) of data to the storage device 41 are performed as appropriate by various devices electrically connected to the storage device 41 via the circuitry of the circuit board 38.

The connector 42 constitutes an interface with other devices not illustrated. Accordingly, the connector 42 is connected to another device (for example, a controller not illustrated) to transmit and receive data (for example, imaging data transmitted from the lens drive module 11) to and from the other device.

In the imaging module 12 and the electronic device 13 illustrated in FIG. 4 as well, the lens unit 10 including the ferromagnetic spacers 21a can reduce the power consumption required to move the lens unit 10 for autofocus driving.

[Second Example of Imaging Module and Electronic Device]

Figure 5:
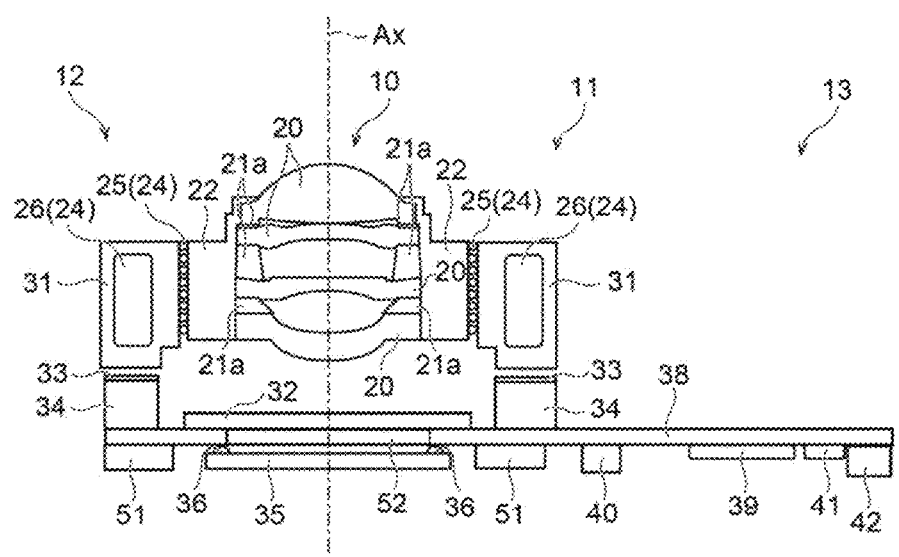
FIG. 5 is a diagram illustrating a schematic configuration of another example of an electronic device (imaging device).

FIG. 5 is a diagram illustrating a schematic configuration of another example of an electronic device 13. In FIG. 5, components that are the same as or similar to those illustrated in FIG. 4 are designated by the same reference numerals, and detailed description thereof will be omitted.

The imaging element 35 included in the imaging module 12 of this example has a flip-chip structure. Specifically, the imaging element 35 is electrically connected to the circuitry of the circuit board 38 via wiring 36 formed of bumps (that is, projecting terminals) instead of metal wires (see FIG. 4). The imaging element 35 illustrated in FIG. 5 is electrically connected via the wiring 36 to circuitry exposed on a surface of the circuit board 38 (hereinafter referred to as the "backside circuit surface") opposite to a surface of the circuit board 38 (hereinafter referred to as the "frontside circuit surface") facing the lens unit 10.

The imaging element 35 and the wiring 36 are surrounded by a protective material 51 attached to the backside circuit surface of the circuit board 38. The protective material 51 protects the imaging element 35 and the wiring 36 when the imaging element 35 is mounted on the circuit board 38 and when the imaging module 12 is mounted on the electronic device 13.

The circuit board 38 includes a translucent portion 52 that transmits light. The translucent portion 52 is formed from a through hole or a translucent member, and is located on the optical axis Ax so as to face the imaging element 35 (in particular, the entire light receiving surface of the imaging element 35) in the optical axis direction. The infrared cut filter 32 is attached to the frontside circuit surface of the circuit board 38 to cover the entire translucent portion 52.

The light transmitted through the plurality of lenses 20 (in particular, the lens central portion) sequentially passes through the infrared cut filter 32 and the translucent portion 52, and enters the light receiving surface of the imaging element 35. Accordingly, the imaging element 35 acquires imaging data.

The lens controller 39, the sensor 40, the storage device 41, and the connector 42, which are illustrated in FIG. 5, are attached to the backside circuit surface of the circuit board 38 and electrically connected to the circuitry exposed on the backside circuit surface. The circuitry exposed on the frontside circuit surface of the circuit board 38 and the circuitry exposed on the backside circuit surface are electrically connected to each other. Accordingly, similarly to the example illustrated in FIG. 4 described above, the lens controller 39 illustrated in FIG. 5 is connected to the second coil 33 via the circuitry of the circuit board 38 and the connection support portion 34, and is connected to the first coil 25 via the circuitry of the circuit board 38 and wiring (not illustrated). Note that the lens controller 39, the sensor 40, the storage device 41, and the connector 42 may be attached to the frontside circuit surface of the circuit board 38, as in the example illustrated in FIG. 4.

Other configurations of the electronic device 13 illustrated in FIG. 5 are the same as those of the electronic device 13 illustrated in FIG. 4 described above.

In the imaging module 12 and the electronic device 13 illustrated in FIG. 5 as well, the lens unit 10 including the ferromagnetic spacers 21a can reduce the power consumption required to move the lens unit 10 for autofocus driving.

[Third Example of Imaging Module and Electronic Device]

Figure 6:
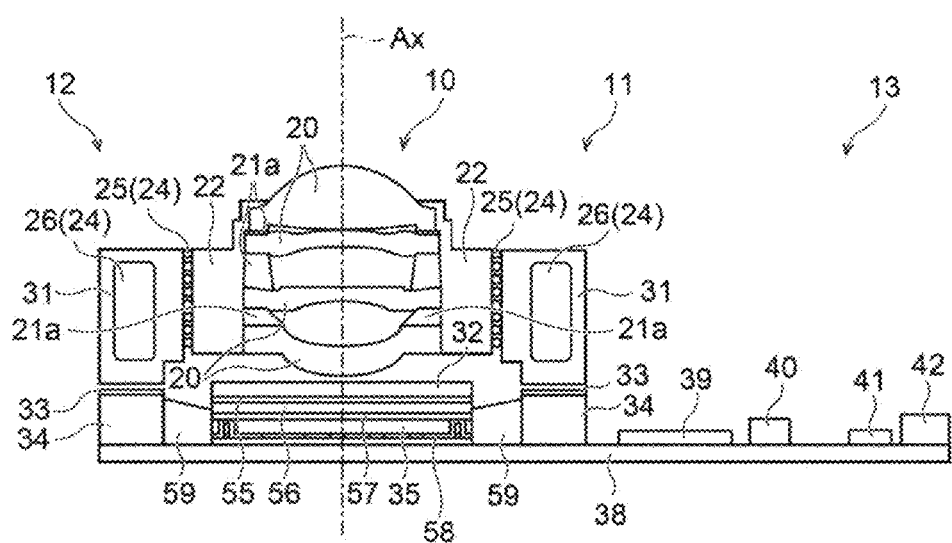
FIG. 6 is a diagram illustrating a schematic configuration of another example of an electronic device (imaging device).

FIG. 6 is a diagram illustrating a schematic configuration of another example of an electronic device 13. In FIG. 6, components that are the same as or similar to those illustrated in FIG. 4 are designated by the same reference numerals, and detailed description thereof will be omitted.

The imaging element 35 included in the imaging module 12 of this example has a chip size package (CSP) structure. In other words, the imaging element 35 is provided as part of an ultra-compact package.

The imaging element 35 illustrated in FIG. 6 is attached to the circuit board 38 via a wiring layer 58. A fixing portion 59 having a light shielding property is provided between the imaging element 35 and the connection support portion 34 on the frontside circuit surface of the circuit board 38. The imaging element 35 is adhered and fixed to the frontside circuit surface of the circuit board 38 by the fixing portion 59. A glass layer 56 is adhered via a second transparent resin 57 to a surface (including the light receiving surface) of the imaging element 35 facing the lens unit 10. The infrared cut filter 32 is adhered to the glass layer 56 further via a first transparent resin 55.

The light transmitted through the plurality of lenses 20 (in particular, the lens central portion) sequentially passes through the infrared cut filter 32, the first transparent resin 55, the glass layer 56, and the second transparent resin 57, and enters the light receiving surface of the imaging element 35. Accordingly, the imaging element 35 acquires imaging data.

Other configurations of the electronic device 13 illustrated in FIG. 6 are the same as those of the electronic device 13 illustrated in FIG. 4 described above.

In the imaging module 12 and the electronic device 13 illustrated in FIG. 6 as well, the lens unit 10 including the ferromagnetic spacers 21a can reduce the power consumption required to move the lens unit 10 for autofocus driving.

[Fourth Example of Imaging Module and Electronic Device]

Figure 7:
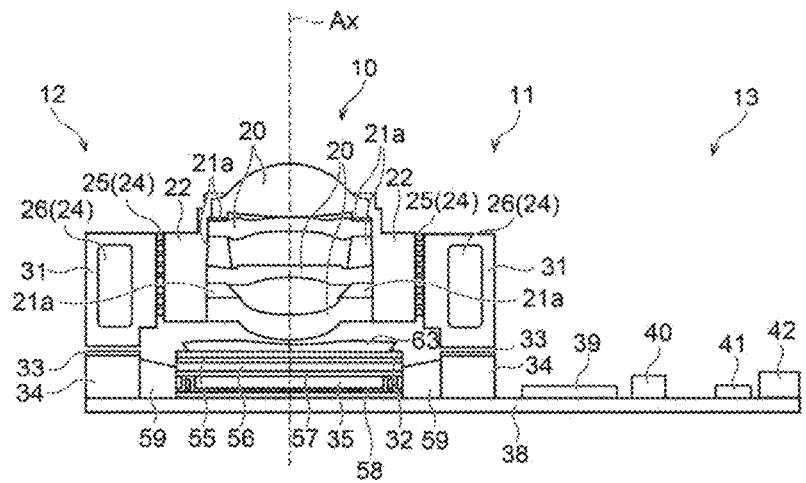
FIG. 7 is a diagram illustrating a schematic configuration of another example of an electronic device (imaging device).

FIG. 7 is a diagram illustrating a schematic configuration of another example of an electronic device 13. In FIG. 7, components that are the same as or similar to those illustrated in FIG. 6 are designated by the same reference numerals, and detailed description thereof will be omitted.

The imaging module 12 of this example includes a lens (that is, a fixed lens) 63 located between the lens unit 10 and the imaging element 35. The lens 63 is separate from the plurality of lenses 20 included in the lens unit 10. The fixed lens 63 illustrated in FIG. 7 is located between the plurality of lenses 20 of the lens unit 10 and the infrared cut filter 32, and is fixedly attached to the infrared cut filter 32 in an imprint bonding manner.

The fixed lens 63 constitutes an optical lens system of the imaging module 12 together with the plurality of lenses 20 included in the lens unit 10. However, in autofocus driving, the plurality of lenses 20 included in the lens unit 10 are moved in the optical axis direction by the lens actuator 24 as described above, while the fixed lens 63, which is integrated with the imaging element 35, is not moved. In other words, the distance in the optical axis direction between the plurality of lenses 20 included in the lens unit 10 and the imaging element 35 is variable, while the distance in the optical axis direction between the fixed lens 63 and the imaging element 35 is invariable.

Other configurations of the electronic device 13 illustrated in FIG. 7 are the same as those of the electronic device 13 illustrated in FIG. 6 described above.

In the imaging module 12 and the electronic device 13 illustrated in FIG. 7 as well, the lens unit 10 including the ferromagnetic spacers 21a can reduce the power consumption required to move the lens unit 10 for autofocus driving.

As described above, the lens unit 10 including the ferromagnetic spacers 21a, the lens drive module 11, the imaging module 12, and the electronic device 13 can effectively reduce the power consumption required to move the lens unit 10.

In particular, the above-described lens unit 10 can be configured with at least one or some of the spacers of the existing lens unit replaced by the ferromagnetic spacer 21a. Therefore, the above-described lens unit 10 is widely and flexibly applied to various types of lens drive modules 11, imaging modules 12, and electronic devices 13, without requiring to have a complicated structure. In addition, the above-described lens unit 10 can effectively contribute to suppressing an increase in manufacturing cost and miniaturizing the device (for example, reducing the size of the device in the optical axis direction).

Further, even in the case where a magnet with a low magnetic flux density or a small magnet is used as the above-described magnet 26, the ferromagnetic spacer 21a effectively causes a magnetic field to act on the first coil 25, so that the lens actuator 24 can properly drive the lens unit 10. Therefore, according to the above-described lens unit 10 including the ferromagnetic spacers 21a, the degree of freedom in selecting the magnets 26 is increased, and relatively inexpensive permanent magnets can be used as the magnets 26.

It should be noted that the embodiments and modifications disclosed herein are merely illustrative in all respects and should not be construed as limiting the present disclosure. The above-described embodiments and variations can be omitted, substituted, and modified in various ways without departing from the scope and spirit of the appended claims. For example, the above-described embodiments and modifications may be wholly or partially combined, and any combination of an embodiment other than above-described embodiments and the above-described embodiments or modifications may be made. In addition, the effects of the present disclosure described herein are merely exemplary and may have other effects.

Further, the technical category in which the above-described technical ideas are embodied is not limited. For example, the above-described technical ideas may be embodied by a computer program for causing a computer to execute one or more procedures (steps) included in the device control method described above. The above-described technical ideas may be embodied by a non-transitory computer-readable recording medium in which such a computer program is recorded.

The present disclosure can also be configured as follows:

[Item 1]

A lens drive module including:
  a lens unit that includes a plurality of lenses and a spacer that includes a ferromagnetic material provided between two adjacent lenses among the plurality of lenses; and
  a lens actuator that causes an electromagnetic force to act on the lens unit in response to energization.

[Item 2]

The lens unit according to Item 1, wherein
  the lens unit includes a plurality of spacers each of which is provided between two adjacent lenses, and
  all the spacers included in the lens unit include a ferromagnetic material.

[Item 3]
    The lens unit according to Item 1, wherein
    the lens unit includes a plurality of spacers each of which is provided between two adjacent lenses, and
    the plurality of spacers include a spacer that includes a ferromagnetic material and a spacer that includes a non-ferromagnetic material.
[Item 4]
    The lens unit according to any one of Items 1 to 3, wherein the lens actuator includes
    a coil that is provided integrally with the lens unit so as to be energized, and
    a magnet that applies a magnetic field to the coil.
[Item 5]
    The lens drive module according to Item 4, wherein the coil is located between the spacer that includes the ferromagnetic material and the magnet.
[Item 6]
    The lens drive module according to Item 4 or 5, wherein the spacer that includes the ferromagnetic material, the coil, and the magnet are located in a same straight line extending in a direction perpendicular to an optical axis of the plurality of lenses.
[Item 7]
    An imaging module including:
    a lens unit that includes a plurality of lenses and a spacer that includes a ferromagnetic material provided between two adjacent lenses among the plurality of lenses;
    an imaging element that performs photoelectric conversion of light entering through the plurality of lenses; and
    a lens actuator that causes an electromagnetic force to act on the lens unit in response to energization to adjust a distance between the lens unit and the imaging element.
[Item 8]
    The imaging module according to Item 7, wherein the imaging element has a flip-chip structure.
[Item 9]
    The imaging module according to Item 7, wherein the imaging element has a CSP structure.
[Item 10]
    The imaging module according to any one of Items 7 to 9, including a lens that is located between the lens unit and the imaging element and is separate from the plurality of lenses included in the lens unit.
[Item 11]
    The imaging module according to any one of Items 7 to 10, including an infrared cut filter.
[Item 12]
    An electronic device including:
    a lens unit that includes a plurality of lenses and a spacer that includes a ferromagnetic material provided between two adjacent lenses among the plurality of lenses;
    an imaging element that performs photoelectric conversion of light entering through the plurality of lenses;
    a lens actuator that causes an electromagnetic force to act on the lens unit in response to energization to adjust a distance between the lens unit and the imaging element; and
    a circuit board that receives an electrical signal from the imaging element.
[Item 13]
    A lens unit including: a plurality of lenses; and a spacer that includes a ferromagnetic material provided between two adjacent lenses among the plurality of lenses.
[Item 14]
    The lens unit according to Item 13, including a plurality of spacers each of which is provided between two adjacent lenses, wherein all the spacers include a ferromagnetic material.
[Item 15]
    The lens unit according to Item 13, including a plurality of spacers each of which is provided between two adjacent lenses,
    the plurality of spacers including a spacer that includes a ferromagnetic material and a spacer that includes a non-ferromagnetic material.

REFERENCE SIGNS LIST

10 Lens unit
11 Lens drive module
12 Imaging module
13 Electronic device
20 Lens
21a Ferromagnetic spacer
21b Non-ferromagnetic spacer
24 Lens actuator
25 First coil
26 Magnet
32 Infrared cut filter
35 Imaging element
38 Circuit board
63 Fixed lens
Ax Optical axis

The invention claimed is:
1. A lens drive module, comprising:
    a lens unit that includes a plurality of lenses and a first spacer, wherein
        the first spacer includes a ferromagnetic material, and
        the first spacer is between two adjacent lenses of the plurality of lenses; and
    a lens actuator configured to cause an electromagnetic force to act on the lens unit, wherein
        the lens actuator includes:
            a coil that is integral with the lens unit; and
            a magnet configured to apply a magnetic field to the coil,
        the electromagnetic force that acts on the lens unit is based on energization of the coil and the magnetic field applied to the coil, and
        in a direction perpendicular to an optical axis of the plurality of lenses, the coil is between the magnet and the first spacer that includes the ferromagnetic material.
2. The lens drive module according to claim 1, wherein
    the lens unit further includes a plurality of spacers including the first spacer,
    each spacer of the plurality of spacers is between the two adjacent lenses of the plurality of lenses, and
    the each spacer of the plurality of spacers includes the ferromagnetic material.
3. The lens drive module according to claim 1, wherein
    the lens unit further includes a plurality of spacers including the first spacer,
    each spacer of the plurality of spacers is between the two adjacent lenses of the plurality of lenses, and
    the plurality of spacers further includes a second spacer that includes a non-ferromagnetic material.

4. An imaging module, comprising:
a lens unit that includes a plurality of lenses and a spacer, wherein
the spacer includes a ferromagnetic material, and
the spacer is between two adjacent lenses of the plurality of lenses;
an imaging element configured to perform photoelectric conversion of light that enters through the plurality of lenses; and
a lens actuator configured to cause an electromagnetic force to act on the lens unit to adjust a distance between the lens unit and the imaging element, wherein
the lens actuator includes:
a coil that is integral with the lens unit; and
a magnet configured to apply a magnetic field to the coil,
the electromagnetic force that acts on the lens unit is based on energization of the coil and the magnetic field applied to the coil, and
in a direction perpendicular to an optical axis of the plurality of lenses, the coil is between the magnet and the spacer that includes the ferromagnetic material.

5. The imaging module according to claim 4, wherein the imaging element has a flip-chip structure.

6. The imaging module according to claim 4, wherein the imaging element has a chip size package structure.

7. The imaging module according to claim 4, further comprising a lens between the lens unit and the imaging element,
wherein the lens is separate from the plurality of lenses included in the lens unit.

8. The imaging module according to claim 4, further comprising an infrared cut filter on the imaging element.

9. An electronic device, comprising:
a lens unit that includes a plurality of lenses and a spacer, wherein
the spacer includes a ferromagnetic material, and
the spacer is between two adjacent lenses of the plurality of lenses;
an imaging element configured to perform photoelectric conversion of light that enters through the plurality of lenses;
a lens actuator configured to cause an electromagnetic force to act on the lens unit to adjust a distance between the lens unit and the imaging element, wherein
the lens actuator includes:
a coil that is integral with the lens unit; and
a magnet configured to apply a magnetic field to the coil,
the electromagnetic force that acts on the lens unit is based on energization of the coil and the magnetic field applied to the coil, and
in a direction perpendicular to an optical axis of the plurality of lenses, the coil is between the magnet and the spacer that includes the ferromagnetic material; and
a circuit board configured to receive an electrical signal from the imaging element.

10. A lens unit, comprising:
a plurality of lenses;
a first spacer that includes a ferromagnetic material, wherein
the first spacer is between a first lens and a second lens of the plurality of lenses, and
the first lens is adjacent to the second lens; and
a second spacer that includes aluminum, wherein
the second spacer is between the second lens and a third lens of the plurality of lenses, and
the second lens is adjacent to the third lens.

* * * * *